United States Patent
Ishii (10) Patent No.: US 8,248,516 B2
(45) Date of Patent: Aug. 21, 2012

(54) FOCUS DETECTION APPARATUS AND CONTROL METHOD THEREFOR

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/492,790

(22) Filed: Jun. 26, 2009

(65) Prior Publication Data
US 2009/0322934 A1    Dec. 31, 2009

(30) Foreign Application Priority Data

Jun. 30, 2008  (JP) ................................. 2008-171718

(51) Int. Cl.
G03B 13/00  (2006.01)
(52) U.S. Cl. ......................... 348/345; 348/348; 348/349
(58) Field of Classification Search .................... 348/78, 348/169–172, 208.12, 208.14, 220.1, 345, 348/348, 349, 356; 396/89, 123, 124, 137
See application file for complete search history.

(56) References Cited

U.S. PATENT DOCUMENTS

| 7,880,804 B2 * | 2/2011 | Hatano et al. ................. 348/354 |
| 7,899,264 B2 * | 3/2011 | Stewart .......................... 382/255 |
| 2003/0071908 A1 * | 4/2003 | Sannoh et al. ................ 348/345 |
| 2006/0182433 A1 | 8/2006 | Kawahara |

FOREIGN PATENT DOCUMENTS

| JP | 2001-215403 A | 8/2001 |
| JP | 2006-227080 A | 8/2006 |
| JP | 2008-139683 A | 6/2008 |

* cited by examiner

Primary Examiner — Lin Ye
Assistant Examiner — Euel Cowan
(74) Attorney, Agent, or Firm — Canon U.S.A., Inc. IP Division (57) ABSTRACT

A focus adjustment apparatus includes a detection unit configured to detect an object image to be focused from a captured image, a setting unit configured to set a focus detection region in the captured image, and a focus adjustment unit configured to adjust an in-focus state of an imaging optical system depending on AF evaluation values based on output signals from the focus detection region. First and second focus detection regions are set for a region which has followed the object image detected and a region which does not follow the object image detected. The focus adjustment unit performs a weighted addition of the AF evaluation values based on the output signals in the first and second focus detection regions at ratios depending on at least either a size of an object image within a screen, a position of the object image within the screen and a shooting mode.

6 Claims, 5 Drawing Sheets

FOCUS DETECTION APPARATUS AND CONTROL METHOD THEREFOR

BACKGROUND OF THE INVENTION

1. Field of the Invention

The present invention relates to a focus detection apparatus that extracts feature portions of an object of shooting, and performs a focus detection based on the extraction result, and a control method therefor.

2. Description of the Related Art

In an automatic focus (AF) control of video cameras, a TV-AF method to generate an AF evaluation value indicating sharpness (contrast state) of a video signal generated by an image sensor, and to search for a position of a focus lens at which the AF evaluation value becomes maximal, has become mainstream. However, there is a problem that when, for example, photographing a person, instead of focusing on the person of a main object, a background comes into focus due to a relationship of a contrast.

To solve such a problem, an image pickup apparatus having face recognition functions is known. For example, an image pickup apparatus (see, for example, Japanese Patent Application Laid-Open No. 2006-227080) sets a focus detection region for detecting an in-focus state in a region including a recognized face region, and performs a focus detection. Alternatively, an image pickup apparatus (see, for example, Japanese Patent Application Laid-Open No. 2001-215403) detects a person's eyes, and performs a focus detection with reference to the detected eyes.

In the focus detection using the face recognition functions described above, when a face has been recognized, a focus adjustment is performed in the recognized face portion, so as to immediately deal with an object person as intended by a user. However, in a case of a moving image pickup process, various objects may often be present on a screen coming one after another. In such a case, if a focus adjustment is performed on a recognized face every time, when a passer-by who happens to pass is temporarily present at an edge of the screen, the focus adjustment will be performed on this person. Eventually, the focus adjustment will not be performed on the person as intended by the user. In other words, generally when picking up a moving image, the user often captures the image so as to arrange the object in the center of the screen. However, when a face is recognized at an edge of the screen, the focus adjustment may be performed on the face at the edge. As a result, the focus adjustment is not performed on the object intended by the user.

Further, in the above-described situation, a face of the object person temporarily present at an edge of the screen is recognized, and the focus adjustment on the face of the person at the edge is going to be performed, but, after that, the person can instantly disappear from the screen. In this case, such an unstable focus adjustment will be performed that the focus adjustment will again be performed on the object located in the center of the screen, which will eventually annoy the user.

SUMMARY OF THE INVENTION

The present invention is directed to a focus detection apparatus capable of performing a stable focus adjustment on an object as intended by a user and to a control method therefore.

According to an aspect of the present invention, a control method for a focus adjustment apparatus includes detecting an object image to be focused from a captured image, setting a focus detection region in the captured image, acquiring an AF evaluation value for adjusting an in-focus state of an imaging optical system depending on the AF evaluation value based on an output signal from the focus detection region to perform a focus adjustment, setting a first focus detection region that has followed the detected object image, and a second focus detection region that does not follow the detected object image, and performing a weighted addition of the AF evaluation values based on the output signals in the first focus detection region and the second focus detection region at ratios depending on at least one of a size of an object image in a screen, a position of the object image in the screen, and a shooting mode, to adjust an in-focus state of the imaging optical system based on a result of the weighted addition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
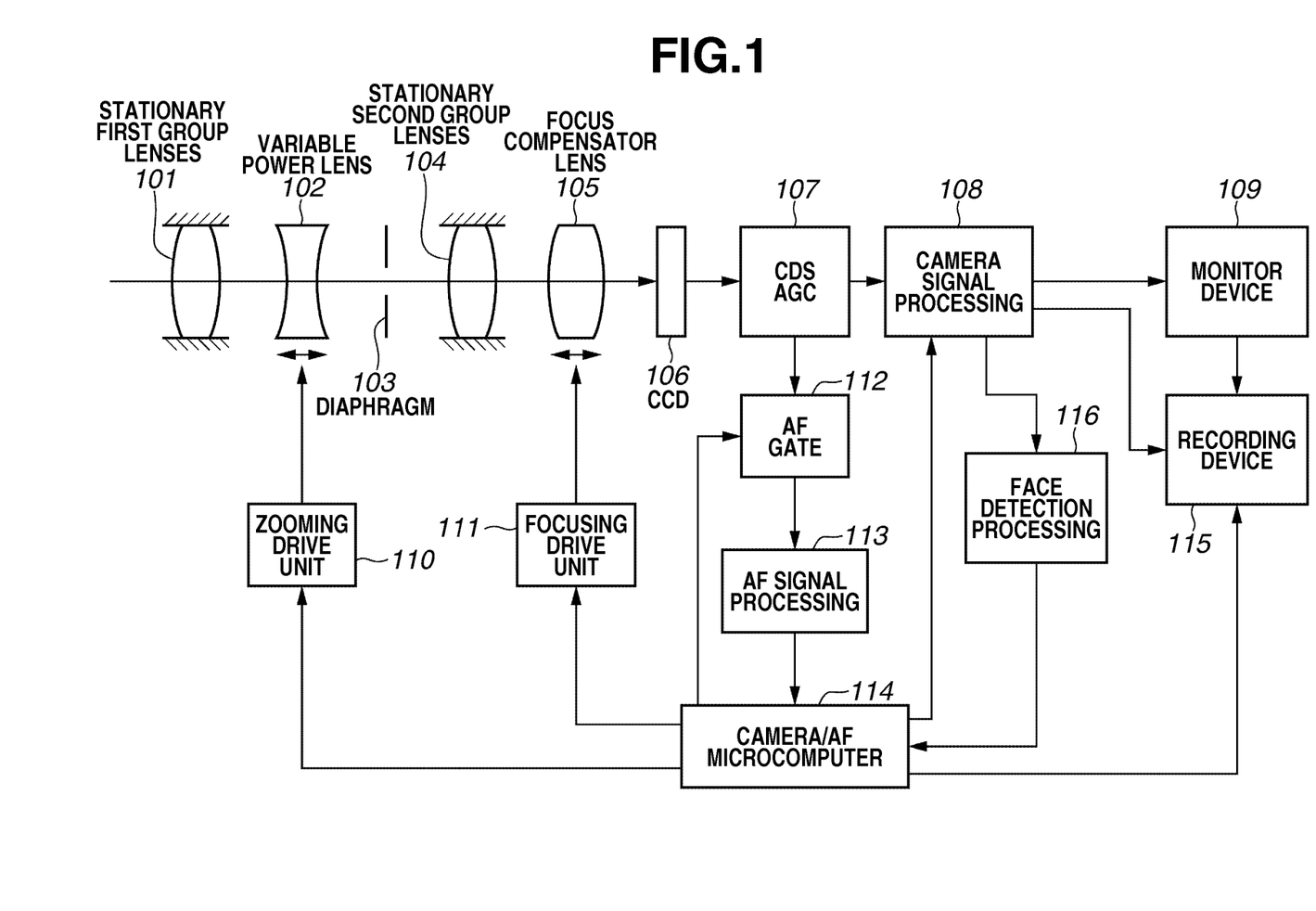
FIG. 1 is a block diagram illustrating a configuration of a video camera.

FIG. 1 illustrates a configuration of a video camera according to an exemplary embodiment of the present invention. In the present exemplary embodiment, the video camera will be described, but the present invention can be applied to digital still cameras and microscopes and other focus detection apparatuses.

As illustrated in FIG. 1, an imaging optical system includes a first stationary lens 101, a variable power lens 102 which moves in an optical axis direction and performs a zooming, and a diaphragm 103. The imaging optical system further includes a second stationary lens 104, and a focus compensator lens 105 (hereinafter referred to as a focus lens) which has a function to correct a movement of a focal plane in association with the zooming as well as a focusing function.

An image sensor 106 is a photoelectric conversion element made up of a charge-coupled device (CCD) sensor and a complementary metal oxide semiconductor (CMOS) sensor. A correlated double sampling (CDS)/automatic gain control (AGC) circuit 107 conducts a sampling of outputs of the image sensor 106 and conducts a gain adjustment.

A camera signal processing circuit 108 performs various image processes on output signals from the CDS/AGC circuit 107, and generates video signals. A monitor 109 includes a liquid crystal display (LCD) or the like, and displays the video signals from the camera signal processing circuit 108. A recording unit 115 records the video signals from the camera signal processing circuit 108 on a recording medium such as a magnetic tape, an optical disk or a semiconductor memory.

A zooming drive unit 110 causes the variable power lens 102 to move. A focusing drive unit 111 causes the focus lens 105 to move. The zooming drive unit 110 and the focusing drive unit 111 include an actuator such as a stepping motor, a direct current (DC) motor, a vibration type motor and a voice coil motor.

An AF gate 112 allows only a signal of a region used for the focus detection to pass therethrough from among the output signals of all pixels from the CDS/AGC circuit 107.

An AF signal processing circuit 113 extracts high-frequency component and luminance difference component (difference between maximum value and minimum value of a luminance level of a signal which has passed through the AF gate 112) and the like from a signal which has passed through the AF gate 112, so as to generate an AF evaluation value as first information. The AF evaluation value is output to a camera/AF microcomputer 114. The AF evaluation value represents a sharpness (contrast state) of a picture generated based on an output signal from the image sensor 106. However, since the sharpness changes according to an in-focus state of an imaging optical system, the AF evaluation value becomes as a consequence a signal which represents the in-focus state of the imaging optical system.

A camera/AF microcomputer (hereinafter simply referred to as a microcomputer) 114 controls an operation of the entire video camera, and performs focus control by controlling the focusing drive unit 111 to cause the focus lens 105 to move. The microcomputer 114 conducts the focus control in a TV-AF method to perform a focus adjustment based on the sharpness of a picture as described above (hereinafter simply referred to as TV-AF).

A face detection unit 116 performs face recognition processing with respect to an image signal to detect a face region of a person in a photographing screen. The face detection unit 116 sends the detection result to the microcomputer 114. The microcomputer 114 sends the information to the AF gate 112 to add a region used for the focus detection to a position including the face region in the screen, based on the above-described detection results.

Furthermore, as face recognition processing, for example, there is a method to extract a skin color region from gradation colors of respective pixels represented by image data, and to detect a face based on a degree of matching with a contour plate of the face prepared beforehand. Further, there is a method to perform a face detection by extracting feature portions of a face, such as eyes, a nose, a mouth, and the like using a known pattern recognition technique. Methods for the face recognition is not limited to the methods as described above, but any method may be used.

Figure 2:
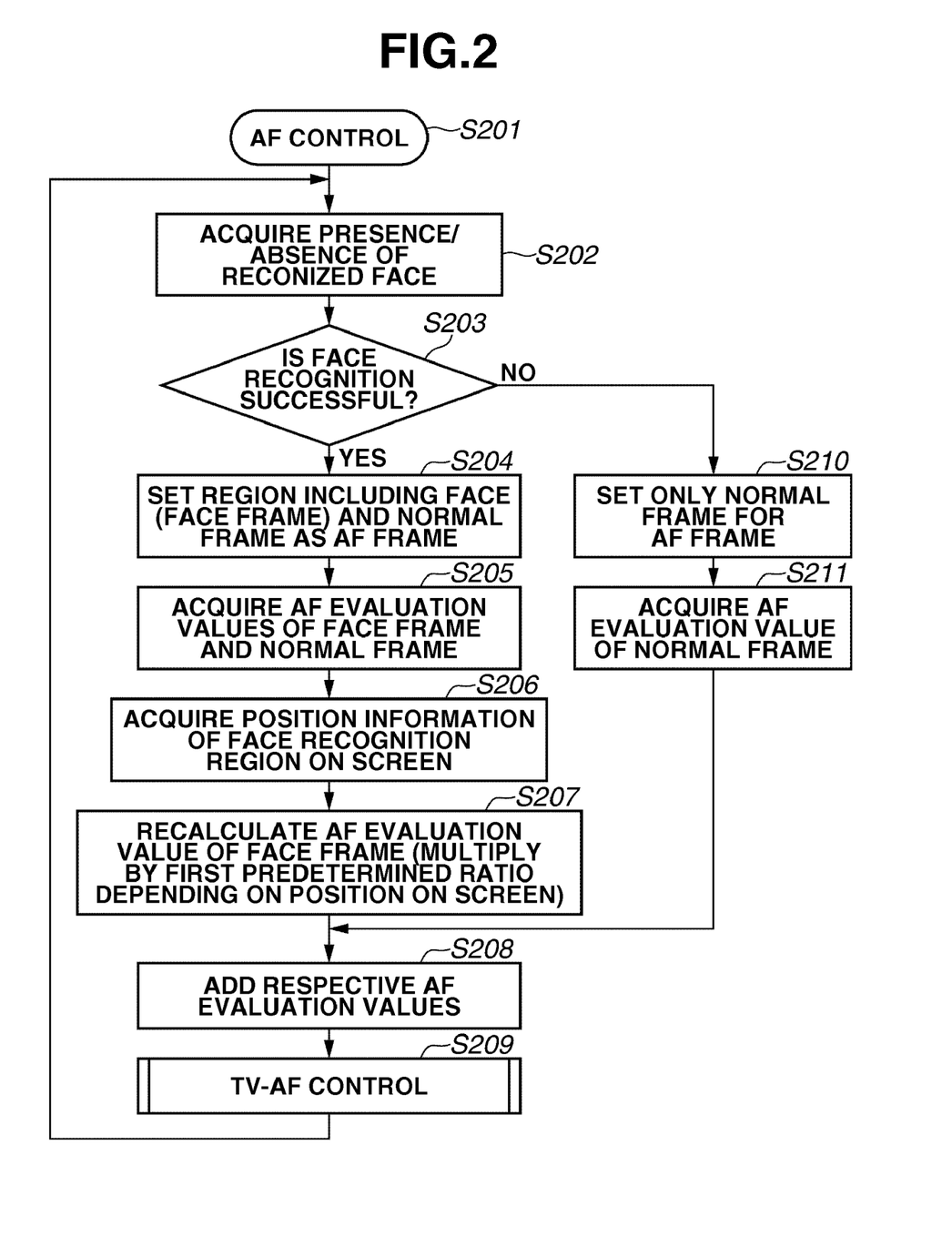
FIG. 2 is a flowchart illustrating a procedure of an AF processing according to an exemplary embodiment.

Next, an AF control (focus control) performed by the microcomputer 114 in an exemplary embodiment will be described with reference to FIG. 2. The AF control is executed in accordance with a computer program stored in the microcomputer 114.

In step S201, the microcomputer 114 starts processing. The processing illustrated in the flowchart is repeated with a cycle of reading of image signals from the image sensor 106 for generating, for example, one field image.

In step S202, the microcomputer 114 acquires presence/absence of a recognized face, based on a result of the face recognition processing performed on a photographed image by the face detection unit 116. In step S203, the microcomputer 114 determines, based on the presence/absence of the recognized face, whether the face recognition has been successfully performed. If the face recognition has been successfully performed (YES in step S203), the process proceeds to step S204. If the face recognition fails (NO in step S203), the process proceeds to step S210.

In step S210, since the face recognition has failed, the microcomputer 114 sets a focus detection region (hereinafter referred to as a normal frame) to the AF gate 112. The normal frame is conventionally set for conducting a normal focus adjustment control and does not follow an object. Next, in step S211, the microcomputer 114 acquires an AF evaluation value from the normal frame, then the process proceeds to step S208.

On the other hand, if the face recognition has been successfully performed, the microcomputer 114 sets a focus detection region which moves following the object including the face region recognized in step S204 (hereinafter referred to as a face frame), and the normal frame to the AF gate 112. Next, in step S205, the microcomputer 114 acquires respective AF evaluation values from the face frame and the normal frame, and the process proceeds to step S206. The respective AF evaluation values acquired in this process are the ones normalized depending on at least one of a region size of the focus detection region, a luminance value, and a contrast value of a signal.

In step S206, the microcomputer 114 acquires information about a position where a face has been recognized on the screen in the face recognition processing by the face detection unit 116. The position information may be the central position of a region where the face has been recognized, or the positions of feature points of the face such as eyes, a nose, and a mouth.

Next, in step S207, a weighting is applied to AF evaluation values (an AF evaluation value normalized for each region) acquired in the face frame, depending on the information about the position on the screen obtained in step S206.

In other words, the microcomputer 114 recalculates the AF evaluation values by multiplying by a first predetermined ratio depending on the information about the position on the screen in the following manner. If the face frame exists near the center of the screen, the weighting for the AF evaluation value of the face frame is increased, and if the face frame exists at an edge of the screen, the weighting of the face frame is decreased.

This is because generally a user often takes a photograph while arranging a main object near the center of the screen. If the focus adjustment is performed using the AF evaluation value of the face frame every time, particularly during a moving image pickup process, an object different from a main object may frequently enter into the screen when photographing. In this case, if a face of an unintended human object that appears at the edge of the screen is recognized, the focus adjustment is performed on the object not intended by the user. Further, if the unintended object moves out of the screen immediately after the microcomputer 114 drives the focus lens to perform a focus adjustment on the unintended object, the microcomputer 114 may drive the focus lens again to perform the focus adjustment to focus on the object in the center. In this case, the focus adjustment seems to be fluctuating, and the adjustment may possibly become unstable.

In this way, if the focus adjustment as described above has occurred, it will annoy a user. For this reason, it is necessary to change the weighting of the AF evaluation value of the face frame depending on the information about the position of a recognized face on the screen, and the weighting of the AF evaluation value of the face frame is designed to be decreased with respect to the face recognized at an edge of the screen.

Now, the first predetermined ratios as described above may be stored in detail in a storage memory as values of ratio data, which are stored depending on all pieces of the information about the position on the screen. Alternatively, the screen may be divided beforehand into two or more regions, and the first predetermined ratios may be stored as the values of the ratio data for each region of the divided screens. Further, in consideration of the position of a person's face when a user arranges a main object on the screen, the ratio data may be determined so as to lay emphasis on upper part rather than the center of the screen.

In step S208, the microcomputer 114 performs a weighted addition of an AF evaluation value of the face frame which has been recalculated, and an AF evaluation value of the normal frame, and generates a resultant AF evaluation value, which is mainly used when performing the focus adjustment in the TV-AF processing.

Figure 3A:
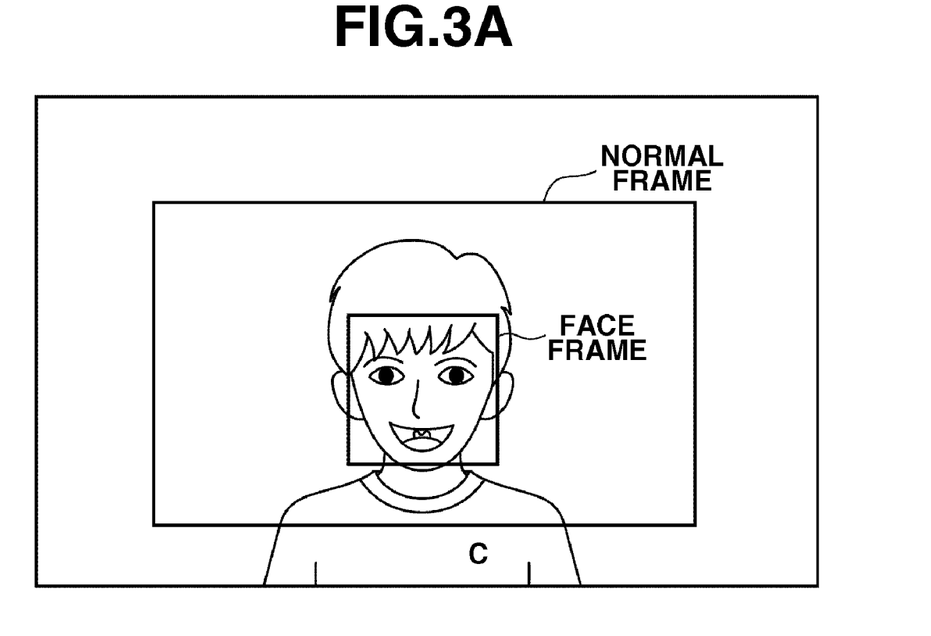
FIGS. 3A and 3B are image diagrams illustrating a setting position of a focus detection region on a screen.
Figure 3B:
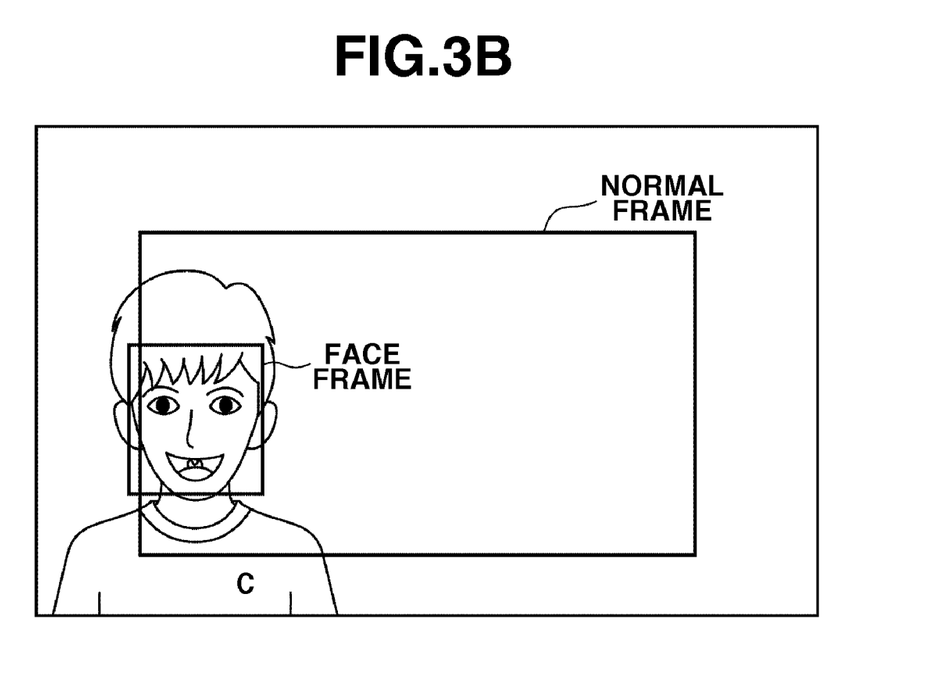

As an example, processing performed in steps S207 and S208 will be described with reference to FIGS. 3A and 3B. FIG. 3A is a case where a person exists in the center of the screen, and FIG. 3B is a case where a person exists at an edge of the screen. In the case of FIG. 3A, a resultant AF evaluation value (A) generated in step S208 will be given in the following equation.

$$\text{Resultant AF evaluation value}(A) = \alpha((A) \times (\text{AF evaluation value of face frame}) + (\text{AF evaluation value of normal frame}) \quad (1)$$

Further, in the case of FIG. 3B, a resultant AF evaluation value (B) generated in step S208 will be given in the following equation.

$$\text{Resultant AF evaluation value}(B) = \alpha(B) \times (\text{AF evaluation value of face frame}) + (\text{AF evaluation value of normal frame}) \quad (2)$$

In these cases, $\alpha(A)$, and $\alpha(B)$ are the first predetermined ratios as described above, which will be expressed by the following relational expression.

$$\alpha(A) > \alpha(B) \quad (3).$$

In step S209, the TV-AF processing is executed using the resultant AF evaluation value generated in step S208. In the TV-AF processing, the focus lens 105 is driven to obtain an in-focus state while monitoring the resultant AF evaluation value so that the resultant AF evaluation value becomes maximal. Further, the TV-AF processing includes also processing for maintaining a focus, such as determining in an in-focus state whether there was a decrease of the resultant AF evaluation value, to decide whether re-driving of the focus lens is necessary.

A number of stationary focus detection regions called a normal frame, which will not follow an object, is not limited to one, but a plurality of regions may be present.

Figure 4:
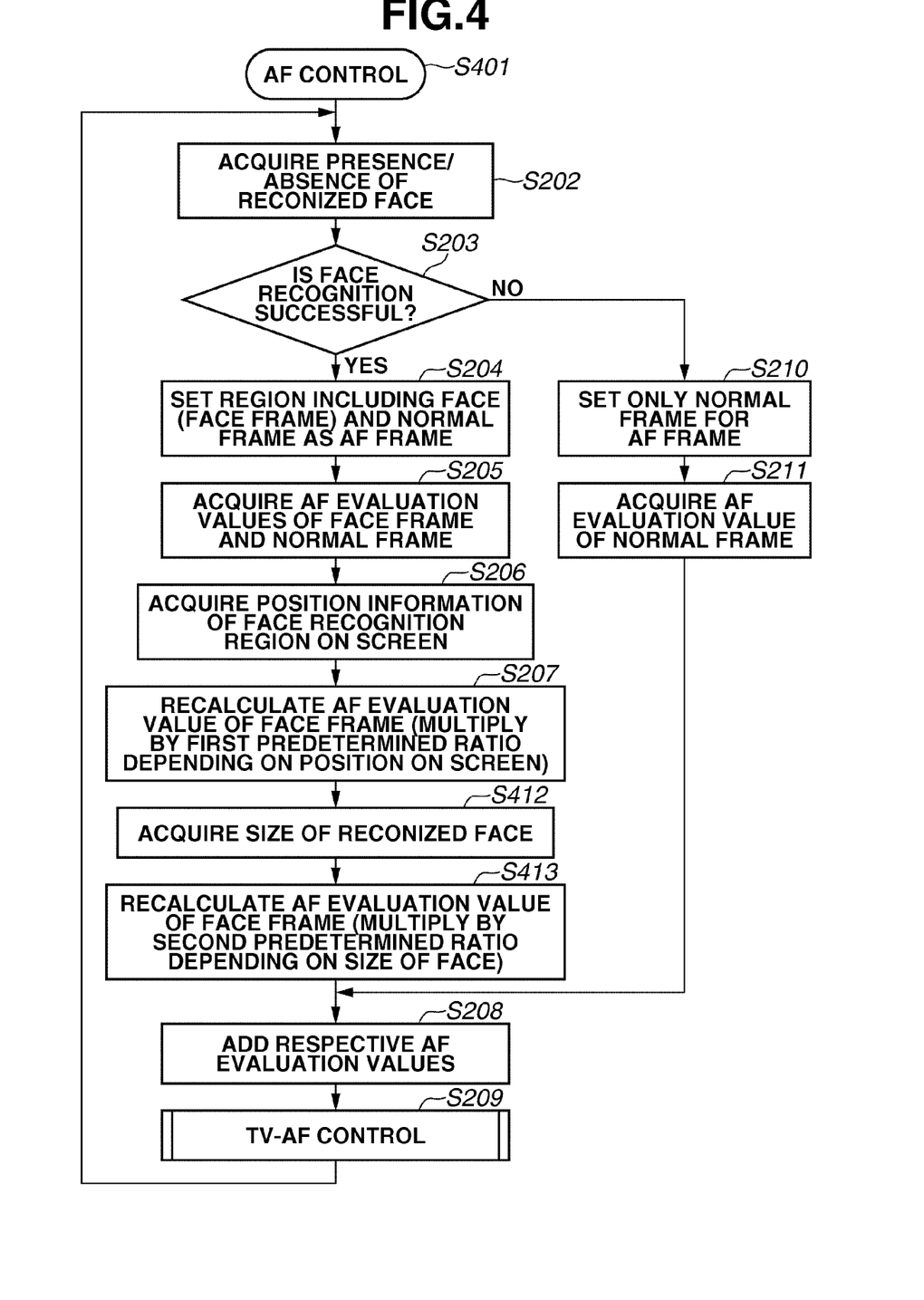
FIG. 4 is a flowchart illustrating a procedure of an AF processing according to another exemplary embodiment.

An AF control in another exemplary embodiment is described next with reference to FIG. 4.

In the present exemplary embodiment, with respect to components in common with the above-described exemplary embodiment, the same reference numbers are used and their descriptions are not repeated.

According to the present exemplary embodiment, in the AF processing is started (S401). The same AF processing as shown in FIG. 2 is performed for steps S202-S207. In the AF processing of FIG. 4, a resultant AF evaluation value is generated by multiplying an AF evaluation value of the face frame by a second predetermined ratio, depending on size information of the face region recognized in the face recognition processing.

More specifically, in step S412, the microcomputer 114 acquires information about the size of a face recognized in the face recognition processing by the face detection unit 116. Next, in step S413, a weighting is applied to the AF evaluation value acquired in the face frame, depending on the size information of the recognized face. More specifically, if the size of the face is large, the weighting of the AF evaluation value of the face frame is increased. On the other hand, if the size of the face is small, the weighting of the AF evaluation value of the face frame is decreased. Thus, the AF evaluation value is recalculated by multiplying by the second predetermined ratio depending on the size of the recognized face.

The weighting is performed here on the AF evaluation value normalized for each region of the focus detection region. However, without normalizing the AF evaluation value of the face frame, different AF evaluation value for each size may be used as a resultant AF evaluation value after the weighting.

Generally, a user takes a photograph of a person while arranging a main human object on a front side. For this reason, the size of the face of the main human object becomes large. On the other hand, in the case of a perspective object, focusing may be unintentionally achieved on a high contrast background, depending on the contrast condition of the background. At this time, the focus adjustment may not be performed on the main human object. In this case, to perform the focus adjustment on a front person, the weighting of the AF evaluation value of the face frame needs to be increased.

In addition, a plurality of persons may exist on the screen. In this case, if the AF evaluation values of the face frame of a human object in the back and a human object in the front are treated equally, the AF evaluation value of the person in the back may become larger depending on the object condition. In such a case, it is difficult to perform a focus adjustment on the person in the front. To reduce such an effect, it is necessary to increase the weighting of the AF evaluation value as the size of the face region increases.

The second predetermined ratios may be stored as values of ratio data, which are stored in a storage memory in detail depending on the size information of the face. Alternatively, the size information of a face is divided beforehand into two or more sizes, and ratio data may be stored for each of divided size information.

Further, as to the first and the second predetermined ratios in step S207 and in step S413, the predetermined ratios may be held individually as storage data. However, the predetermined ratios in which the information about a position on the screen and the size information of the face have been combined and associated with each other, may be stored beforehand as storage data. In this case, it is also possible to acquire one third predetermined ratio, depending on information arbitrarily determined from the position information on the screen and the size information of the face, and recalculate it by multiplying an AF evaluation value of the face frame so as to calculate a resultant AF evaluation value.

Further, in the present exemplary embodiment, not only the size information of the recognized face obtained from the face detection unit 116, but also the position information on the screen recognized are included. However, the exemplary embodiment is not limited to thereto. It is possible to utilize only the size information of the recognized face.

Figure 5:
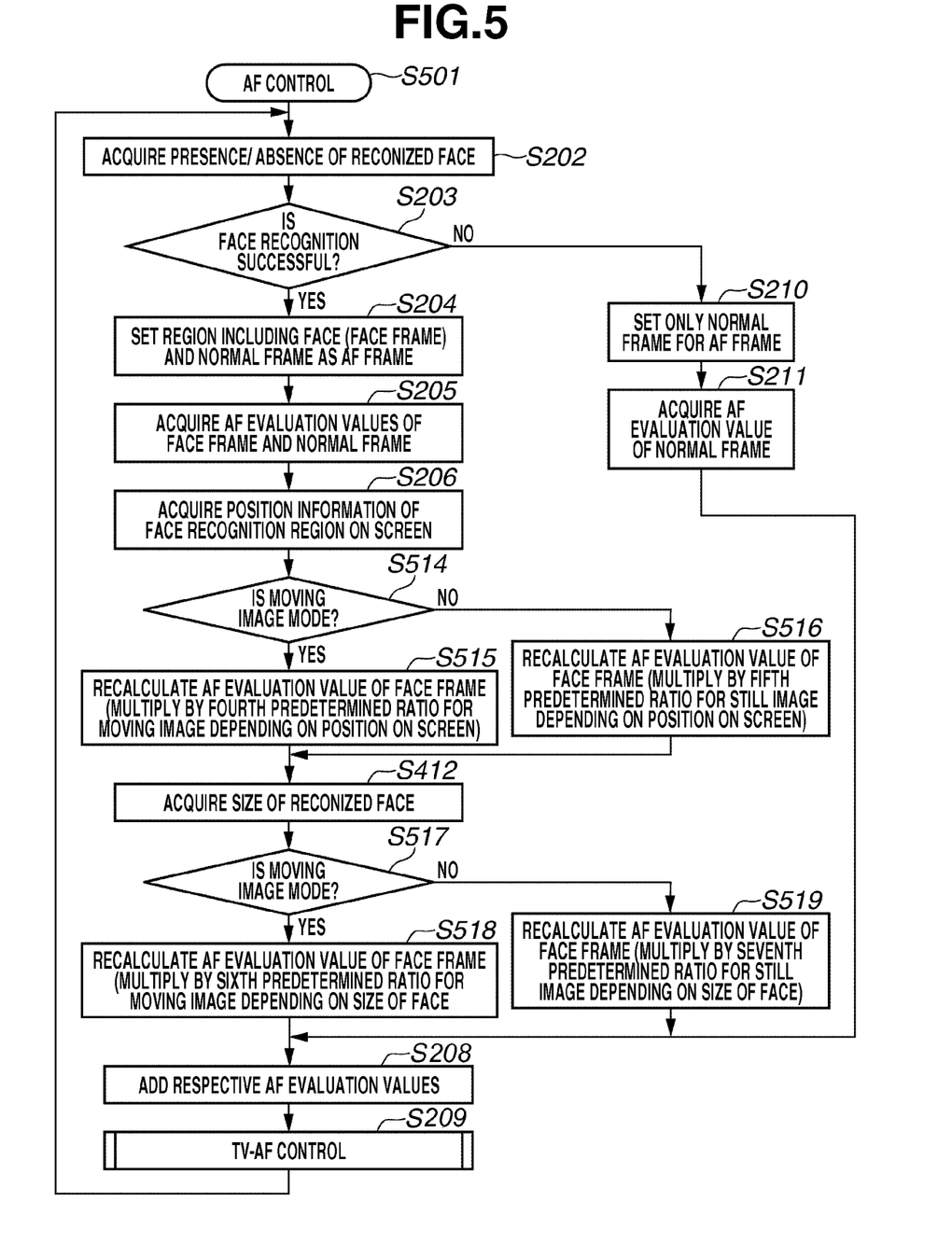
FIG. 5 is a flowchart illustrating a procedure of an AF processing according to another exemplary embodiment.

AF control in another exemplary embodiment is described next with reference to FIG. 5.

In the present exemplary embodiment, the same reference numbers are used for components in common with the above-described exemplary embodiments, and their descriptions are not repeated.

In the present exemplary embodiment, the AF processing described in the above-described exemplary embodiments is performed such that the weighting in adding the AF evaluation values of the face frame is varied according to operation modes of the image pickup apparatus to generate the resultant AF evaluation value, thus performing the focus adjustment. As a specific example, the AF processing of the second exemplary embodiment is taken as the reference, which can also be applied to the AF processing of the first exemplary embodiment.

More specifically, in step S514 and in step S517, the microcomputer 114 determines a shooting mode, namely a moving image shooting mode or a still image shooting mode. In a case of the moving image shooting mode (YES in step S514), in step S515 and in step S518, the weighting of the AF evaluation values of the face frame is conducted by multiplying by a fourth predetermined ratio, or a sixth predetermined ratio depending on information about the position on the screen and the size information of the face, respectively. Then, in step S208, the microcomputer 114 performs weighting when adding the AF evaluation values of the face frame recalculated by multiplying by respective predetermined ratios and the AF evaluation value of the normal frame, and executes the TV-AF processing in step S209 using the resultant AF evaluation values. In a case of the still image shooting mode (NO in step S514), in step S516 and in step S519, the weighting of the AF evaluation values of the face frame is conducted by multiplying by a fifth predetermined ratio, or a seventh predetermined ratio, depending on information about the position on the screen and the size information of the face, respectively. Then, in step S208, the microcomputer 114 performs weighting when adding the AF evaluation values of the face frame recalculated by multiplying by respective predetermined ratios and the AF evaluation value of the normal frame, and executes the TV-AF processing in step S209 using the resultant AF evaluation values.

In this case, regarding the predetermined ratios used in respective moving image shooting mode and still image shooting mode, the still image shooting mode has a higher ratio than the moving image shooting mode. This results from the following reason. In the moving image shooting mode, the human object is constantly moving, so that in some cases stable face recognition can not be performed. Therefore, if the effect of the AF evaluation value of the face frame is increased too much, the AF evaluation values will be frequently varied between a face recognizing case and not recognizing case, and the focus adjustment will become unstable. On the other hand, in the case of the still image shooting mode, a user mostly determines beforehand a composition of photographing, and a person which is to be an object is usually in a stable state. For this reason, focus adjustments rarely become unstable. Further, in the case of the still image shooting mode, to prevent missing of a shutter chance, it is necessary to make it easy to focus on a main human object.

Now, a fourth, a fifth, a sixth and a seventh predetermined ratio may be stored, similar to the above-described exemplary embodiments, as values of ratio data. The values of ratio data may be stored in detail in a storage memory, depending on the shooting modes, information about the position of the recognized faces on the screen and the size information of the faces. Alternatively, information about the position on the screen and the size information of the faces may be divided beforehand into two or more parts depending on the shooting modes, and the values of ratio data may be stored. Furthermore, the predetermined ratios in which information about the position of the recognized faces on the screen, and the size information of the faces have been combined and associated with each other, depending on the shooting modes, may be stored beforehand as storage data. In this case, in the moving image shooting mode, the microcomputer 114 recalculates the resultant AF evaluation value by multiplying the AF evaluation value of the face frame by an eighth predetermined ratio in the moving image shooting mode. The eighth predetermined ratio depends on the information determined by information about the position of the recognized face on the screen and the size information of the face. Furthermore, in the still image shooting mode, the microcomputer 114 recalculates a resultant AF evaluation value by multiplying the AF evaluation value of the face frame by a ninth predetermined ratio in the still image shooting mode. The ninth predetermined ratio depends on the information determined by information about the position of the recognized face on the screen of and the size information of the face.

Further, in the exemplary embodiments described herein, the microcomputer 114 generated the resultant AF evaluation value by multiplying the AF evaluation value of the face frame by the predetermined ratio depending on information about the position of the recognized face on the screen, the size information, and the shooting mode. However, the exemplary embodiment is not limited thereto. Namely, the AF evaluation value of the normal frame may also be multiplied by a predetermined ratio. For example, in the case of the first exemplary embodiment, the resultant AF evaluation value may be generated using the first predetermined ratio by which the AF evaluation value of the face frame is multiplied, depending on information about the position of the recognized face on the screen. Further, the resultant AF evaluation value may be generated using a tenth predetermined ratio by which the AF evaluation value of the normal frame is multiplied, depending on information about the position of the recognized face on the screen. When the above-described equations (1), (2) are applied, $$\text{Resultant AF evaluation value}(A') = \alpha(A) \times (\text{AF evaluation value of face frame}) + \alpha(A) \times (\text{AF evaluation value of normal frame}) \quad (1')$$

$$\text{Resultant AF evaluation value}(B') = \alpha(B) \times (\text{AF evaluation value of face frame}) + \beta(B) \times (\text{AF evaluation value of normal frame}) \quad (2')$$

Where, $\beta(A)$, $\beta(B)$ are the tenth predetermined ratios, and following relationship may be formed:

$$\beta(A) < \beta(B) \quad (3')$$

If a person's face is present at an edge of the screen, the weighting of the AF evaluation value of the face frame is decreased, and the AF evaluation value of normal frame is increased. On the other hand, if a person's face is present in the center of the screen, in order to make it easier to reliably focus on the person, the weighting of the AF evaluation value of the face frame is increased, and the AF evaluation value of the normal frame is decreased. In this way, in consideration of an arrangement of the main object person on the screen, matrix data of the first predetermined ratios and the tenth predetermined ratios for each frame depending on the position information of the face recognized on the screen may be stored in the storage memory. In this case, the microcomputer 114 performs weighted addition of respective AF evaluation values using these values in step S208 to generate resultant AF evaluation values.

As described above, when the face of the human object is recognized in the face recognition processing, the microcomputer 114 sets a face frame including a region of the recognized face which follows the human object, and a normal frame which does not follow the human object, to perform the focus adjustment operation. The resultant AF evaluation values are generated by the weighted addition of the AF evaluation value of the face frame and the AF evaluation value of the normal frame. The resultant AF evaluation values are used when performing the focus adjustment operation.

Then, in adding the AF evaluation value of the face frame and the AF evaluation value of the normal frame to generate the resultant AF evaluation value, the microcomputer 114 performs the weighted addition of the AF evaluation values of the face frame and the normal frame at the predetermined ratios, which are obtained with the respective percentages for weighting. The predetermined ratios depend on information of the position on the screen of the recognized face, the size information of the face, or the shooting modes. By this process, the weighting of the AF evaluation value of the face frame is varied. As a consequence, a user can perform a stable focus adjustment on the main object as intended. Accordingly, an unstable phenomenon, which can occur during the moving image pickup process (for example, the focus adjustment fluctuates unsteadily as a result of the focus adjustment on the object not intended by the user, which has temporarily entered into the edge of the screen during the pickup process) can be reduced.

Further, a focus adjustment may be unintentionally performed on a high contrast object on the background rather than on a person of main object, depending on the object condition of the background. Accordingly, the person of main object may be out of focus. Such a phenomenon can also be reduced.

Further, in the case of the still image shooting mode, the focus adjustment can be performed in which a user does not miss a shutter chance by using the predetermined ratio different from that in the moving image shooting mode. Accordingly, the stable focus adjustment can be performed on the person of main object intended by the user, and an annoyance of the user can be reduced in the focus adjustment.

In the exemplary embodiments described above, a focus detection region corresponding to the position of a detected face in a captured image is set as a face frame. When focusing is attained, focusing of the focus detection region corresponding to the face is shown in the screen. However, a particular object may be a subject of detection as an object image to be focused by other kinds of image detection. For example, it is conceivable to cut out and detect an object image from a background. In addition, by inputting a position in the screen from an external input unit, and detecting a line of sight of a photographer watching a finder, the position in the screen may be determined.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-171718 filed Jun. 30, 2008, which is hereby incorporated by reference herein in its entirety.

What is claimed is:

1. A focus adjustment apparatus comprising:
a detection unit configured to detect an object image to be focused from a captured image;
a setting unit configured to set a focus detection region in the captured image; and
a focus adjustment unit configured to adjust an in-focus state of an imaging optical system depending on AF evaluation values based on output signals from the focus detection region,
wherein the setting unit sets a first focus detection region which has followed the object image detected by the detection unit, and a second focus detection region which does not follow the object image detected by the detection unit, and the focus adjustment unit performs a weighted addition of the AF evaluation values based on the output signals in the first focus detection region and the second focus detection region at ratios depending on at least one of a size of an object image within a screen, a position of the object image within the screen, and a shooting mode, and adjusts the in-focus state of the imaging optical system based on a result of the weighted addition, when the detection unit detects the object image, and the setting unit sets the second focus detection region, and the focus adjustment unit adjusts the in-focus state of the imaging optical system based on the AF evaluation values based on the output signals in the second focus detection region, when the detection unit does not detect the object image.

2. The focus adjustment apparatus according to claim 1, wherein the focus adjustment unit is configured to perform a weighted addition in which a ratio of an AF evaluation value based on an output signal in the first focus detection region is higher when the first focus detection region is located in the center of the screen, and is lower as it is located closer to an edge of the screen.

3. The focus adjustment apparatus according to claim 1, wherein the focus adjustment unit is configured to perform a weighted addition in which the larger the first focus detection region, the higher a ratio of an AF evaluation value based on an output signal in the first focus detection region, and the smaller the first focus detection region, the lower the ratio.

4. The focus adjustment apparatus according to claim 1, wherein the focus adjustment unit is configured to perform in a still image shooting mode addition in which a ratio of the AF evaluation value based on an output signal in the first focus detection region is higher than that in a moving image shooting mode.

5. The focus adjustment apparatus according to claim 1, wherein the object image detected by the detection unit is a face region of a person in the screen based on a captured image.

6. A method for controlling a focus adjustment apparatus that adjusts an in-focus state of an imaging optical system, the method comprising:
detecting an object image to be focused from a captured image;
setting a focus detection region in the captured image;
adjusting an in-focus state of an imaging optical system depending on AF evaluation values based on an output signal from the focus detection region to perform a focus adjustment;
setting a first focus detection region that has followed the detected object image, and a second focus detection region that does not follow the detected object image; and
performing a weighted addition of the AF evaluation values based on the output signals in the first focus detection region and the second focus detection region at ratios depending on at least one of a size of an object image in a screen, a position of the object image in the screen, and a shooting mode, to adjust an in-focus state of the imaging optical system based on a result of the weighted addition, wherein adjusting comprises adjusting the in-focus state of the imaging optical system based on the AF evaluation values based on the output signals in the second focus detection region, when the object image is not detected.

* * * * *